(12) United States Patent
Balasubramanian

(10) Patent No.: US 9,380,437 B2
(45) Date of Patent: *Jun. 28, 2016

(54) MANAGING A PACKET SERVICE CALL WITHIN MOBILE COMMUNICATIONS USER EQUIPMENT

(71) Applicant: Apple Inc., Cupertino, CA (US)

(72) Inventor: Sanjeevi Balasubramanian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/244,682

(22) Filed: Apr. 3, 2014

(65) Prior Publication Data

US 2014/0220944 A1    Aug. 7, 2014

Related U.S. Application Data

(63) Continuation of application No. 13/348,520, filed on Jan. 11, 2012, now Pat. No. 8,712,425.

(51) Int. Cl.
| | |
|---|---|
| *H04W 4/16* | (2009.01) |
| *H04W 76/02* | (2009.01) |
| *H04W 48/16* | (2009.01) |
| *H04W 88/06* | (2009.01) |

(52) U.S. Cl.
CPC .............. *H04W 4/16* (2013.01); *H04W 76/026* (2013.01); *H04W 48/16* (2013.01); *H04W 88/06* (2013.01)

(58) Field of Classification Search
None
See application file for complete search history.

(56) References Cited

U.S. PATENT DOCUMENTS

| | | |
|---|---|---|
| 7,460,515 B1 | 12/2008 | Chowdhury et al. |
| 7,924,811 B2 | 4/2011 | Asokan |
| 2003/0232629 A1 | 12/2003 | Jang et al. |
| 2005/0215241 A1 | 9/2005 | Okada |
| 2005/0226202 A1 | 10/2005 | Zhang et al. |
| 2005/0239444 A1 | 10/2005 | Shieh |
| 2006/0114882 A1 | 6/2006 | Mills |
| 2007/0058549 A1 | 3/2007 | Speks et al. |
| 2007/0133519 A1 | 6/2007 | Florkey et al. |
| 2007/0281727 A1 | 12/2007 | Bowen |
| 2009/0010247 A1 | 1/2009 | Stille |

(Continued)

FOREIGN PATENT DOCUMENTS

| | | |
|---|---|---|
| WO | 2005104600 A1 | 11/2005 |
| WO | 2006040515 A1 | 4/2006 |
| WO | 2011150255 A2 | 12/2011 |

OTHER PUBLICATIONS

International Search Report and Written Opinion of the International Searching Authority, mailing date May 6, 2013, for corresponding International Application No. PCT/US2013/020958, 7pages.

(Continued)

*Primary Examiner* — Daniel Lai
(74) *Attorney, Agent, or Firm* — Meyertons, Hood, Kivlin, Kowert & Goetzel, P.C.

(57) ABSTRACT

While a circuit service, CS, call is in progress, a request for a packet service, PS, call is received from a background task that is running in the mobile communications user equipment. In response to receiving the request, several air interface parameters that relate to the in-progress CS call are evaluated, in order to decide whether or not to block the PS call based on the evaluation. Other embodiments are also described and claimed.

23 Claims, 4 Drawing Sheets

(56) References Cited

U.S. PATENT DOCUMENTS

| | | | | |
|---|---|---|---|---|
| 2009/0028127 | A1* | 1/2009 | Walker | H04W 72/10 370/348 |
| 2010/0284333 | A1 | 11/2010 | Shirota et al. | |
| 2011/0021204 | A1 | 1/2011 | Chaudry et al. | |
| 2011/0039537 | A1 | 2/2011 | Madhavan et al. | |
| 2011/0103305 | A1 | 5/2011 | Ali et al. | |
| 2012/0309375 | A1* | 12/2012 | Austin | H04W 4/001 455/418 |

OTHER PUBLICATIONS

International Search Report and Written Opinion of the International Searching Authority, mailing date May 6, 2013, for corresponding International Application No. PCT/US2013/025413, 9 pages.

"3G0324M Toolkit for Developing 3G Conversational Multimedia and Streaming Enabled Entities", RADVISION, Product Specification, 2007 RADVISION, Ltd., P/N 46008-00043, Rev A 01-07, (4 pages).

"Guideline for 3G RF Optimization—American Movil LATAM Projects", Nokia Siemens Networks (NSN), Revised by: Danilo Cabral, Aug. 27, 2007, Version 1.1, Originators: Raj Sandhu, Allan Bispo and Daniel Platero, (92 pages—Whole Document).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Table of Contents, (14 pages).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Chapter 4 General Packet Radio Service, pp. 79-81, (3 pages).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Chapter 4 General Packet Radio Service, pp. 91-92, (2 pages).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Chapter 4 General Packet Radio Service, pp. 129-142, (14 pages).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Chapter 6 Universal Mobile Telecommunications System, pp. 265-342, (80 pages).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Chapter 6 Universal Mobile Telecommunications System, 381-386, (6 pages).

Bannister, Jeffrey, et al., "Convergence Technologies for 3G Networks IP, UMTS, EGPRS, and ATM", Copyright 2004, John Wiley & Sons Ltd., The Atrium, Southern Gate, Chichester, West Sussex, England, ISBN 0-470-86091-X (HB), Chapter 6 Universal Mobile Telecommunications System, pp. 407-414, (8 pages).

Boggia, G., et al. "Drop Call Probability in Established Cellular Networks: from data Analysis to Modeling", Vehicular Technology Conference, 2003, Internet download PDF/Adobe Acrobat at: citeseerx.ist.psu.edu/viewdoc/download?doi=10.1.1.104 . . . , (5 pages).

Schulzrinne, Henning, et al., "Interaction of Call Setup and Resource Reservation Protocols in Internet Telephony", Jun. 15, 1999, Internet download PDF/Adobe Acrobat at www.cs.columbia.edu/sip/drafts/resource.pdf, (15 pages).

\* cited by examiner

MANAGING A PACKET SERVICE CALL WITHIN MOBILE COMMUNICATIONS USER EQUIPMENT

RELATED APPLICATION

The instant application is a continuation application of, and hereby claims priority to, pending U.S. patent application Ser. No. 13/348,520, which is titled "Managing a Packet Service Call within Mobile Communications User Equipment," by inventor Sanjeevi Balasubramanian, which was filed on 11 Jan. 2012, and which is incorporated by reference.

BACKGROUND

Mobile terrestrial communication networks can now provide the user of a mobile device such as a cellular phone or a smart phone both packet services and circuit services simultaneously. The circuit service enables the user of a smart phone to participate in delay sensitive multimedia communications, such as a live spoken conversation, via a voice or video call with a far-end user. This is referred to as a circuit service (CS) call. At the same time, the smart phone can conduct a data session with a remote server to, for instance, download a web page or upload its geo positional location data, as enabled by a packet service (PS) call. Simultaneous PS and CS calls are occurring more frequently as mobile communication network providers are willing to provide more services to their subscribers. When the mobile communications user equipment is in an area where there is relatively poor radio frequency (RF) coverage from a serving base station system, there is a higher probability that an ongoing CS call will be dropped by the network due to uplink loss, or by the user equipment due to downlink loss. One particular scenario for a potential CS call drop is where a CS call is in progress when a PS call is being established that was requested by a background task running in the user equipment.

SUMMARY

An embodiment of the invention is a method for managing, within mobile communications user equipment, a packet service (PS) call, so as to improve the retainability of an in progress circuit service (CS) call, particularly when the user equipment finds itself in a poor RF coverage area. The method includes receiving a request to establish a PS call from a background task, while the CS call is in progress. In response, a number of air interface parameters that relate to the in progress CS call are automatically evaluated, to decide whether or not to block the PS call. This technique may be useful when the requesting background task has a lower priority (for establishing a new PS call) than that of one other background task, which may also be running in the user equipment. Examples of such low priority background tasks include a game application that has been moved into the background, a location services task, and an email client in the background, all of which may need to access a remote server over the Internet at any given moment.

The decision whether or not to block the requested PS call may be further based on a stored history of PS call blocks performed by the user equipment. For instance, the decision may be to block the PS call when received signal code power, RSCP, from the serving base station is less than a predetermined threshold and a parameter known as EcNo is also less than a predetermined threshold, while the stored history indicates that there have been fewer than a maximum number of PS call blocks. Alternatively, the decision may be to block the PS call when user equipment transmit power is greater than a predetermined threshold, and the stored history indicates there have been fewer than the maximum number of PS call blocks.

Another embodiment of the invention is a mobile telephony device (e.g., a smart phone) that has a processor and data storage in which are stored a telephony module and a PS call manager. The telephony module (when executed by the processor) manages a CS call that is in progress. The PS call manager may then receive a request to establish a PS call from a background task running in the mobile device, and in response evaluates several air interface parameters that relate to the in progress CS call. On that basis, the PS call manager then decides whether or not to block the PS call. The air interface parameters may include received signal strength from a serving base station, and user equipment transmit power to the serving base station (in connection with the in progress CS call). When the decision is to block the PS call, the PS call manager may start a timer in (response to the decision to block the PS call). Upon expiration of the timer, and the CS call being still in progress, the PS call manager can evaluate the air interface parameters again and then decide whether or not to continue to block the PS call.

When the decision is to allow the PS call, because a stored history indicates that a maximum number of PS call blocks have been reached, then the PS call manager may reset the stored history to indicate that there have been zero PS calls, in preparation for the next PS call request coming from a background task.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
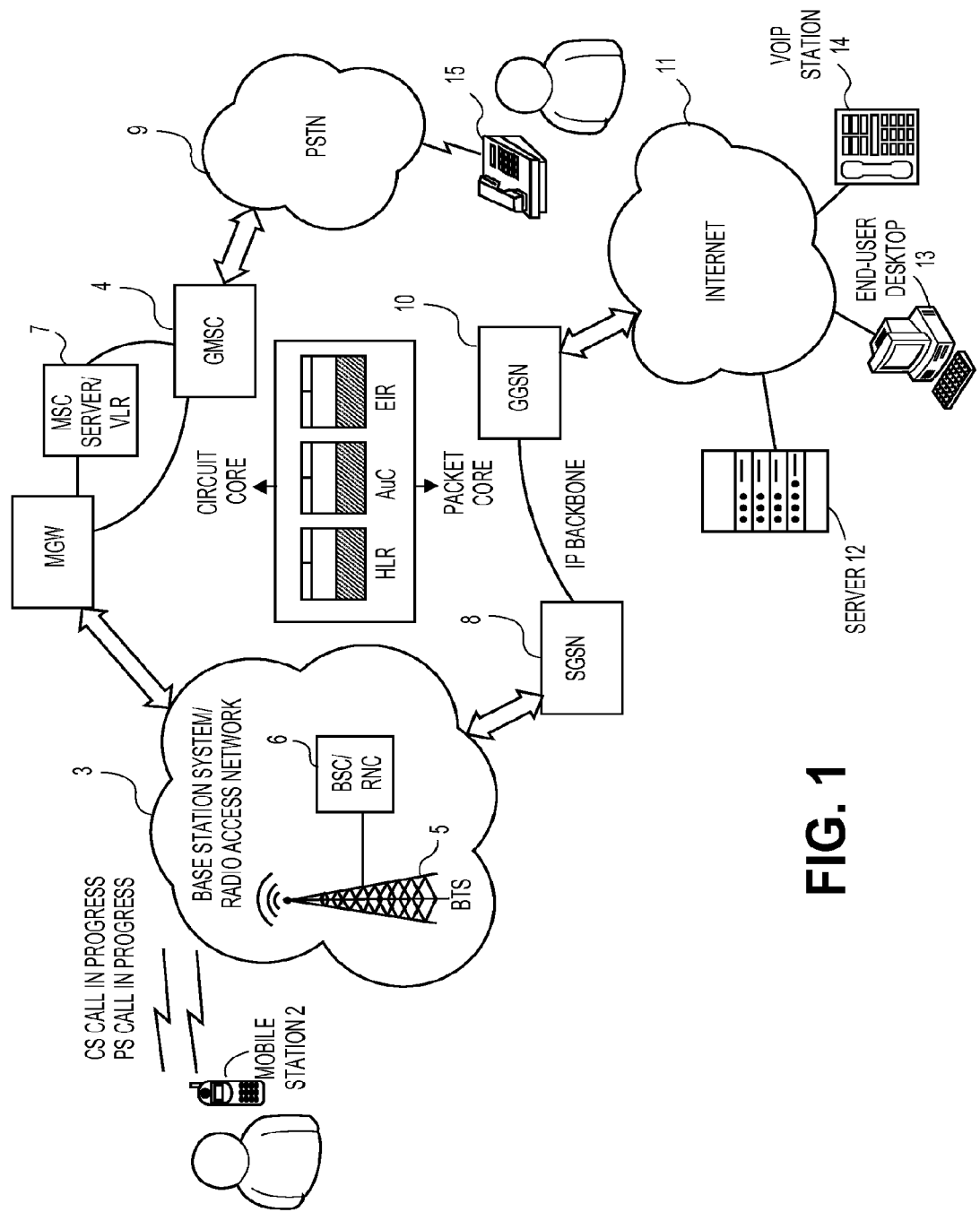
FIG. 1 is a block diagram of a mobile communications network showing a PS call and a CS call in progress simultaneously.

FIG. 1 is a block diagram of a mobile terrestrial communications network showing a PS call and a CS call. The mobile communication network includes a mobile station 2, in which the embodiments of the invention are implemented. The mobile station 2 is also referred to as mobile communications user equipment or a mobile telephony device. The device is a consumer electronics unit that is typically purchased by a user who may also be a subscriber to mobile communication services that are delivered via the network. Examples include a cellular telephone, a smart phone, a tablet computer, and a laptop or notebook computer. The device is capable of two-way real-time voice communications, also referred to as voice calls and video calls (e.g., cellular phone calls). Such calls require that the network guarantee a quality of service (QoS) in terms of reserving sufficient network resources so as to ensure sufficiently short communications signal delay, in order to enable a natural sounding spoken conversation between the user and another user at a far-end of the communications network. The far-end user may be conducting the conversation through, for instance, landline telephone user equipment 15 which is an end node of a public switched telephone network (PSTN) 9. Such voice or video calls are examples of what are referred to here as circuit service (CS) calls, because traditionally a voice call was guaranteed the needed QoS by virtue of a dedicated circuit being assigned to the call by Plain Old Telephone Service (POTS), and that was created through which to connect the near-end and far-end user stations, for the entire duration of the call.

A CS call as used here is a wireless service for delay sensitive communications. CS calls are for applications that are more sensitive to bit error rates and to variant routing delays. Examples of such communications include two-way, real-time or live voice telephony. As suggested above, a CS call may be a service that can guarantee a fixed delay QoS. This is in contrast to a packet service (PS) call as described below, a service which the mobile station 2 is also capable of providing.

A PS call is a wireless service for delay tolerant Internet Protocol (IP) applications, such as email, chat, multimedia message service (MMS), MP3 streaming, multi-party gaming, electronic banking and electronic commerce, wireless imaging, presence (e.g., using session initiation protocol (SIP) service), and GPS/location based services. A PS call may not be able to guarantee a fixed delay QoS. Note that in the network depicted in FIG. 1, the PS call is entirely transported by a packet switched service in the packet core network, where the content to be communicated to and from the mobile station 2 is split into packets or segments and each segment has its own header information; not so with the CS call (while it is transported in the circuit core network). Another difference between the CS and PS call services lies in their QoS.

The mobile communications network can provide CS and PS calls that are in progress simultaneously. In other words, a user of the mobile station 2 can participate in a spoken conversation with the far-end user over the PSTN 9 (e.g., user of the landline station 15), while at the same time send an update or notification to a server 12 via the Internet 11. These may be, for instance, notifications from a client or mobile application running in the mobile station 2, that are directed to a game server, an instant messaging server (e.g., where an end-user desktop 13 also contains an instant messaging client that is alerted regarding the presence of a peer instant messaging client running in the mobile station 2) and a location services server.

To enable the provision of simultaneous PS and CS calls, the mobile communications network may be in accordance with the specifications provided by the third generation partnership project (3GPP) under General Packet Radio Service (GPRS) and universal mobile telecommunications system (UMTS). In this architecture, a radio access network (RAN) 3 has an air interface to the mobile station 2 that uses wideband code division multiple access (WCDMA), and a predominantly wired interface to the packet and circuit cores using asynchronous transfer mode (ATM) as the transport. The RAN 3 has several base transceiver stations (BTSs) also referred to as a wideband BTS (WBTS) 5, or a Node B as described in the 3GPP specifications. The WBTS 5 may support multipurpose wireless solutions, including transceivers for GSM, enhanced data rates for global evolution (EDGE), and microwave plesiochronous or synchronous digital hierarchy interfaces (PDH or SDH). The radio access network 3 also includes a base station controller or radio network controller (BSC/RNC) 6 in which decisions for network operation are made. It may contain a high-speed packet switch to support a reasonable throughput of CS and PS traffic (e.g., voice and data traffic). It is also responsible for control of all the WBTSs that are connected to it, and maintains a link to the packet and circuit cores, via a link to a media gateway (MGW) and a mobile switching center server/visitor location register (MSC server/VLR) 7 for the circuit core, and a separate link to a serving GPRS support node (SGSN) 8 for the packet core. Access to Internet services is provided by a gateway GPRS support node 10.

The circuit core may include, in addition to the MSC server/VLR 7, a high-speed data connection to a gateway MSC (GMSC) 4 which may be a gateway to a plain old telephone system analog network in the PSTN 9. The circuit core may be based on a traditional global system for mobile communications (GSM) core network that is typically used for providing cellular voice telephony services, while the packet core may be a general packet radio service (GPRS) core network that provides data services (traffic in the form of packets e.g., IPV4 or IPV6 packets, and usually referred to as non-voice services). The GPRS core network allows an existing GSM base station system infrastructure to be reused, where the latter was originally designed for a GSM voice network. GPRS traffic is redirected by the base station controller or radio network controller 6 to the packet core via a serving GPRS support node (SGSN) 8. The typical GSM functionality of the home location register (HLR), equipment identity register (EIR), and authentications center (AuC) are needed to support CS and PS calls with the mobile station 2. Such GSM functionality may thus be shared by the packet services so that a user of the mobile station 2 who is sending an email does not need their location information handled any differently than when making a phone call.

The packet core contains the SGSN 8 which connects to the radio access network 3 and performs authentication and mobility management. An IP backbone connects the SGSN 8 to a gateway GPRS support node (GGSN) 10 which is at the edge of and provides access to services on the Internet 11. The Internet Protocol may be used to connect the serving GPRS support node (SGSN) 8 with the gateway GPRS support node (GGSN) 10, allowing data services such as email or web browsing on the mobile station 2.

Figure 2:
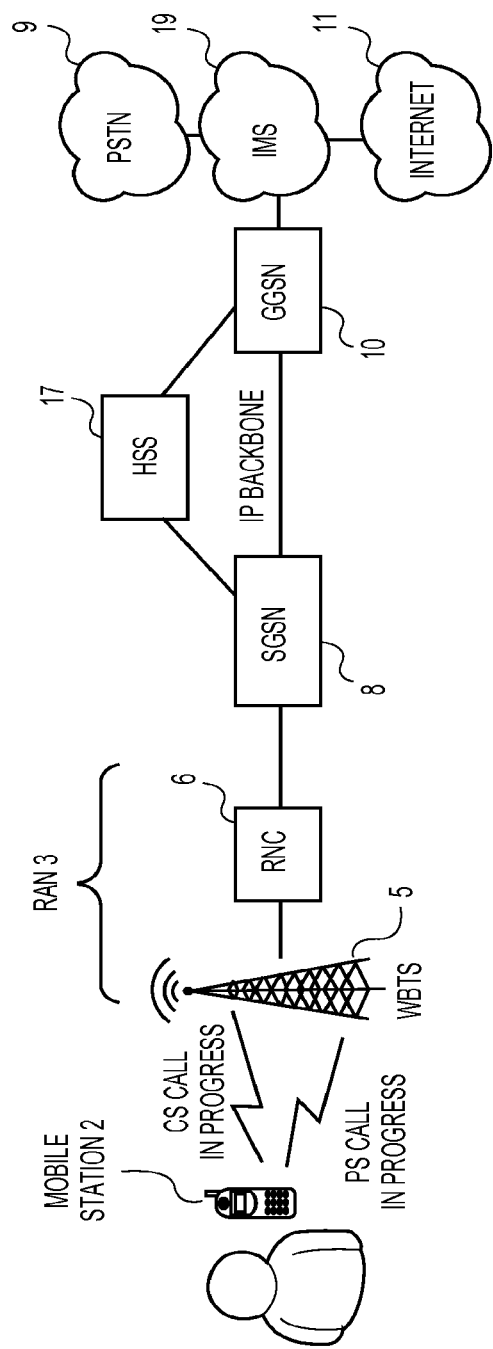
FIG. 2 is a block diagram of another mobile communications network supporting simultaneous CS and PS calls in progress.

The traditional architecture of FIG. 1 has evolved into that of FIG. 2, where the circuit core has been replaced with an IP network infrastructure that is based around voice over IP (VoIP) technology. The mobile communications network is now essentially made of several IP clouds, which may be merged into a single IP over ATM backbone as shown. The IP protocol thus extends across the whole communications network all the way to the WBTS 5. In this case, the home location register, visitor location register, and EIR may be generalized and referred to as the HLR subsystem or home subscriber server (HSS) 17. CS calls such as voice and video calls are supported through the introduction of an IP multimedia subsystem (IMS) 19. It should now be appreciated that while originally the reference to a CS call referred to a communications session that was established through a circuit core that was separate from a packet core, the evolved mobile network depicted in FIG. 2 uses the same core network infrastructure shown, including the now shared components of the SGSN 8 and the GGSN 10, to support both PS and CS calls simultaneously.

The radio access network (RAN) 3 provides a service described as a radio access bearer (RAB) to enable the transfer of user data between the mobile station 2 and the core mobile network. For each user connection to the core network, a RAB is established for transport of signaling or traffic. There may be multiple RABs that have been requested and then set up. A RAB assignment request is a message that initiates the establishment of a radio link and associated radio bearers in the core network. The request also contains the needed QoS parameters for the RNC to determine the requisite resource allocation for the radio link and the other requirements in order to meet the QoS. This is where a PS call may be distinguished from a CS call, that is, in the form of two RABs that have different QoS.

The mobile station 2 may be idle and is ready to connect to the network, for example, in response to a page or to perform a location update. After sending a connection request and receiving a response set up message from the radio network controller 6, a connection is established between the mobile station 2 and the RNC 6 such that the mobile station is now connected with the network. Once the mobile device is thus connected with the mobile network, it cannot start to send and receive data over the packet core until it has established a session, which may be referred to as an active packet data protocol context (PDP context). A PDP context is needed when the user selects a particular service by, for instance, scrolling through a menu that is being displayed in the mobile station 2 and selecting an Internet application such as a Web browser or a music streaming program. The PDP context activation results in the mobile station 2 obtaining an IP address. A request for an external network connection is passed from the mobile station through the network, to the SGSN 8. The SGSN 8 then locates the correct GGSN 10 which will be used to route data from the mobile station to the correct external network (e.g., the Internet). There may be more than one GGSN connected to the external network for load sharing and a redundancy. Once a PDP context has been activated in this manner (and the PS call is thus said to be established), the user can then use the services provided by an access point to the external network, in this example the Internet, e.g. surfing the web, checking email, and streaming music. The mobile station 2 may have several PDP contexts that are active at any one time, with one IP address for each primary PDP context that is activated.

Figure 3:
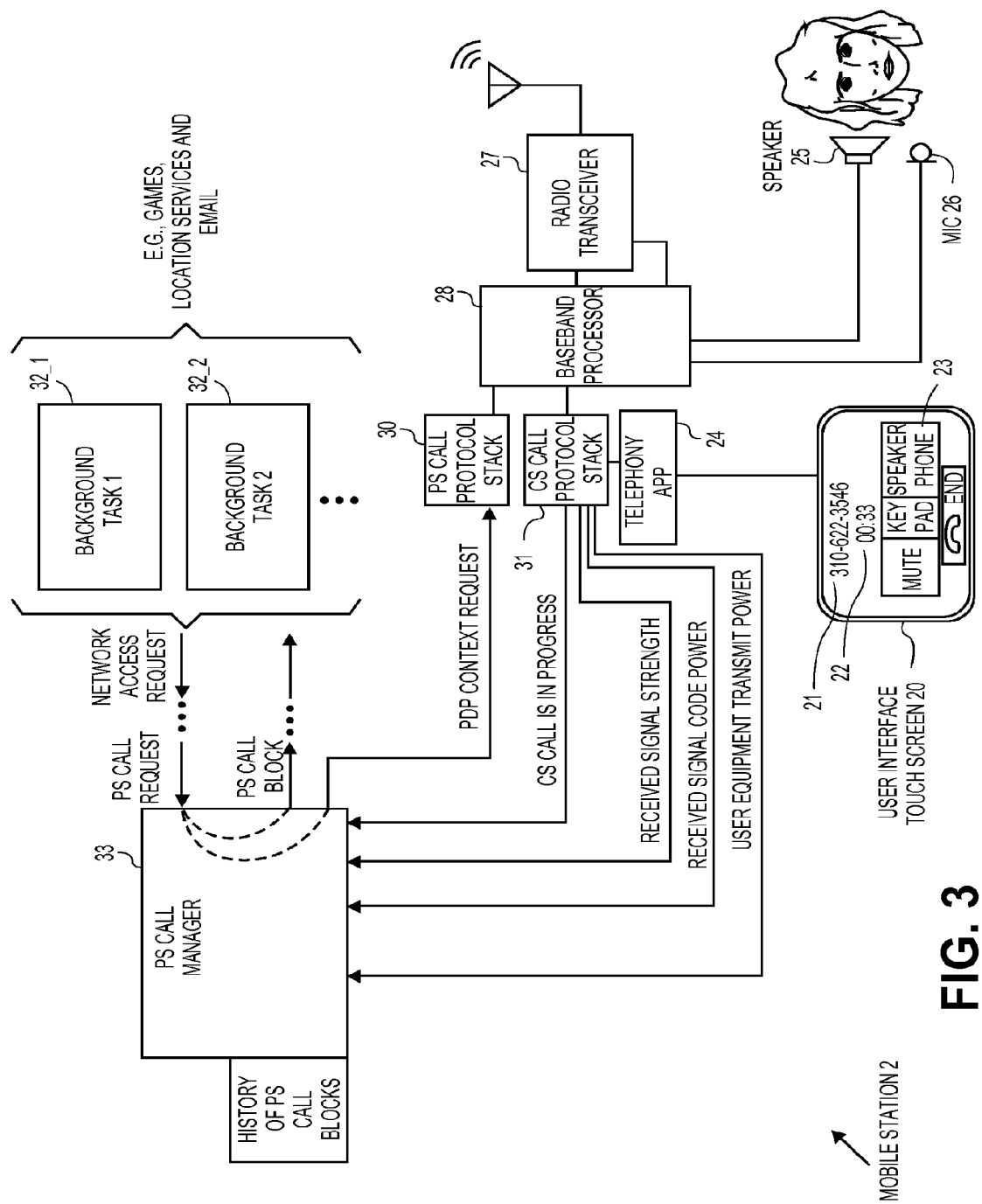
FIG. 3 is a combined software and hardware diagram of relevant portions of a mobile station or mobile communications user equipment, in accordance with an embodiment of the invention.

Turning now to FIG. 3, a combined software and hardware diagram of relevant portions of the mobile station 2, in accordance within an embodiment of the invention, is shown. The diagram also shows the situation where a CS call is in progress, meaning that the CS call has already been setup and established between the near end and far end devices (e.g., mobile station 2 and VOIP station 14), such that a live two-way voice conversation can be conducted by the near end and far end users, respectively. A PS call manager 33 in the mobile station 2 has received a request for a PS call from a background task 32 that is running in the mobile station 2. There may be several background tasks 32_1, 32_2, . . . as shown. The requesting background task 32 may be a game, a location service, an e-mail client, or other background task that may need access to an external network, i.e., outside the core mobile network.

The PS call manager 33 can respond to the received PS call request by either blocking the call (issuing a PS call block, which may eventually make its way back to the requesting background task 32) or it may decide to send a PDP context request to service the PS call request. This is depicted by the dotted lines in FIG. 3. The PDP context request may be signaled to a conventional PS call protocol stack 30, which may be present as part of the operating system running in the mobile station 2 together with a CS call protocol stack 31. The call protocol stacks 30, 31 may be part of a 3G-324M software tool kit that contains application programming interfaces for developing software that enables packet service and circuit service calls in a mobile station. It should be understood that the PS call manager 33, including the capabilities described below in connection with the algorithm of FIG. 4, may be supplied as part of such a software tool kit to developers of software that runs in a mobile station and that enables, for instance, the telephony application 24 to manage all aspects of a CS call.

Upon receiving the PS call request, the PS call manager 33 may evaluate several air interface parameters that relate to the in progress CS call, in order to decide whether or not to block the PS call. In one embodiment, these air interface parameters may include received signal strength from a serving base station, and user equipment transmit power to the serving base station. Another air interface parameter may be received signal code power. Such parameters may be provided by a base band processor 28 and/or by a radio transceiver 27. The base band processor 28 may be a GSM/UMTS base band processor, or it may be a HSPA/EDGE multimedia base band processor that interfaces with an EDGE/HSPA multi-mode, multi-band cellular transceiver.

In addition to evaluating the air interface parameters, the PS call manager 33 (upon receiving the PS call request) may access a stored history of PS call blocks by the mobile station 2. Its decision as to whether or not to block the current PS call is further based on the stored history. Details of various algorithms for the decision making process are given below in connection with FIG. 4.

Still referring to FIG. 3, the mobile station 2 may include a user interface touch screen 20 on which can be displayed several graphical objects 21-23 during the in progress CS call. These include a call identifier object 21, which in the case of an outgoing call displays the name, telephone number or address of the called party. Alternately, the call identifier object displays the name, telephone number or address of the calling party in the case of an incoming call. Also shown is an elapsed time object 22, which indicates the elapsed time of the incoming call or outgoing call. Finally, this being a touch screen user interface, there is a keypad object 23, which contains several virtual buttons that are typically present in a telephony handset including a mute button, a speaker phone button, and a hang up or end button. As an alternative to the touch screen 20, a separate display and keyboard or keypad may be provided. A speaker 25 and microphone 26 may be integrated within the housing of the mobile station 2, such as an earpiece speaker or receiver that is located at one end of a cellular or smart phone handset, and a primary or speaker microphone at another end. Alternatively, the speaker 25 and microphone 26 may be part of a headset that is communicatively coupled to the handset via a cable connection or via a wireless connection.

Figure 4:
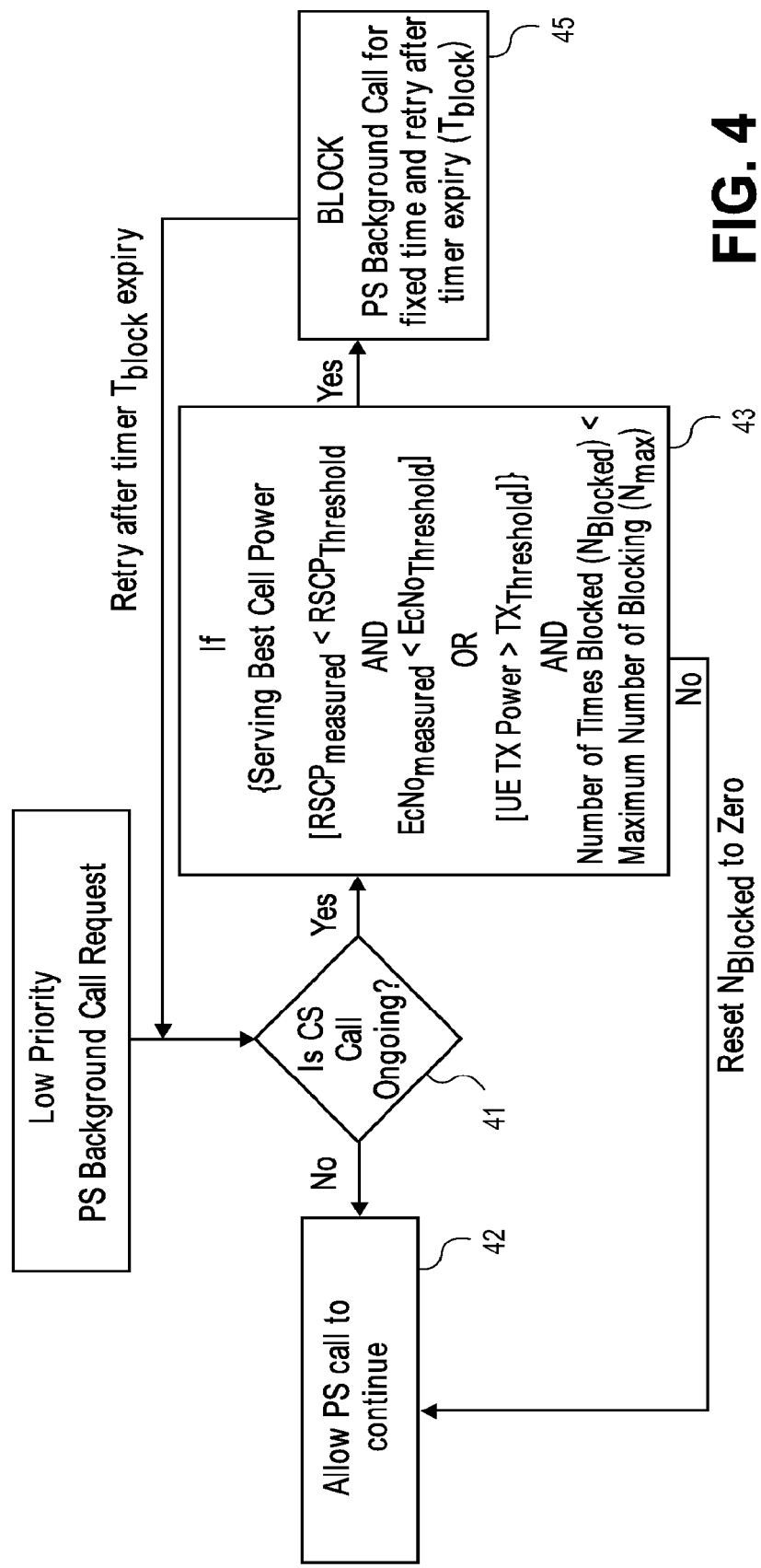
FIG. 4 is a flow diagram of an algorithm that can be performed by a PS call manager running in the mobile communications user equipment.

Turning now to FIG. 4, a flow diagram of an algorithm that can be performed by the PS call manager 33 is shown. Performance of this algorithm may occur in parts; in other words, not all of the branches and conditions shown are required in each instance. The process may be triggered by the incoming PS call request that is received from the background task 32. This may be a low priority background task, or a low priority request from a background task (collectively referred to in FIG. 4 as a "low priority PS background call request"), where the background task has a lower priority for establishing a PS call than that of a foreground task that may, or may not, be running in the mobile station 2. There may also be at least one higher priority background task running in the mobile station 2. As an alternative, the algorithm in FIG. 4 could apply to any PS call request regardless of the priority of the requesting background task.

Upon receipt of the PS call request, if there is no CS call that is in progress (block 41), then the PS call may be allowed to continue (block 42), i.e. the PS call manger 33 may send a PDP context request through the PS call protocol stack 30 (see FIG. 3). If, however, the PS call request is received during an ongoing CS call (block 41), then one or more of the conditions indicated in block 43 are evaluated and may result in the following outcomes. In one outcome, the decision is to block the PS call (block 45) when the following two conditions are satisfied: the measured received signal code power, $RSCP_{meas.}$, from the serving base station is less than a predetermined threshold ($RSCP_{threshold}$) while measured EcNo is also less than a predetermined threshold ($EcNo_{threshold}$); and the stored history of PS call blocks indicates that there have been fewer than a maximum number of PS call blocks. In another instance, the decision is to block the PS call (block 45) when the following two conditions are satisfied: user equipment transmit power (UETX) is greater than a predetermined threshold ($TX_{thres}$); and the stored history indicates that there have been fewer than a maximum number of PS call blocks. In both instances, when the decision is to block the PS call (block 45), a timer may be started in response to the decision to block the PS call, such that upon expiry of the timer, and the CS call being still in progress, one or more air interface parameters are reevaluated to decide whether or not to continue to block the PS call. In other words, as recited in block 45, the PS background call request is blocked for a fixed time interval, and then the one or more conditions in block 43 are reevaluated after the timer has expired (where the timer interval is indicated as $T_{block}$).

In another outcome, evaluation of the conditions in block 43 results in a decision to allow the PS call (block 42). In one instance, this occurs when measured RSCP from the serving base station is greater than its threshold or measured EcNo is greater than its predetermined threshold, while the user equipment transmit power UETX is less than its predetermined threshold. In another outcome, the decision is to allow the PS call when the stored history indicates that a maximum number of PS call blocks have been reached. In both cases, where the decision is to allow the PS call (block 42), the stored history may be reset to indicate that there have been zero PS call blocks. Until that point, each time block 45 is reached, the variable that counts the number of call blocks ($N_{blocked}$) is incremented. The algorithm described above, including its various outcomes, presents an efficient technique for selectively blocking low priority PS background call requests, in a manner that is believed to reduce the likelihood of dropped calls due to multiple RABs (e.g., at least two that have different QoS) being present simultaneously in the mobile station 2.

As explained above, an embodiment of the invention may be a machine-readable medium (such as microelectronic memory) having stored thereon instructions, which program one or more data processing components (generically referred to here as "a processor") to perform the digital operations described above in connection with the PS call manager. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, the mobile network architecture described in FIG. 1 and FIG. 2 has a UMTS terrestrial radio access network and UMTS cores (circuit and packet). The PS call manager may alternatively or in addition be configured to manage PS calls in a mobile station that complies with other popular mobile terrestrial cellular network specifications in the industry. These include radio interface technologies and core network architectures such as IMT-Advanced (International Mobile Telecommunications Advanced) featuring WiMax 2 as described in IEEE 802.16m, OFDMA (Orthogonal Frequency Division Multiple Access), and LTE-Advanced (Long Term Evolution) as described in 3GPP Technical Report (TR) 36.913 which features the Evolved Packet Core (EPC) also known as the System Architecture Evolution (SAE) core. The description is thus to be regarded as illustrative instead of limiting.

What is claimed is:

1. A method for managing, by mobile communications user equipment, a packet service (PS) communication, the method comprising:
   receiving a request for a PS communication from a background task running in the mobile communications user equipment;
   determining that a circuit service (CS) call is in progress;
   in response to the determining, evaluating a plurality of air interface parameters relating to the in progress CS call and accessing a stored history of PS communication blocks by the mobile communications user equipment; and
   deciding whether to block the PS communication based at least in part on the evaluation and the stored history.

2. The method of claim 1, wherein the background task has a lower priority for establishing a PS communication than that of one other background task which is also running in the mobile device.

3. The method of claim 1, wherein the plurality of air interface parameters comprise received signal strength from a serving base station and user equipment transmit power to the serving base station.

4. The method of claim 1, further comprising deciding to block the PS communication when:
   received signal code power (RSCP) from a serving base station is less than a predetermined threshold and EcNo is less than a predetermined threshold; and the stored history indicates that there have been fewer than a maximum number of PS communication blocks.

5. The method of claim 1, further comprising deciding to block the PS communication when:
   user equipment transmit power is greater than a predetermined threshold; and
   the stored history indicates that there have been fewer than a maximum number of PS communication blocks.

6. The method of claim 1, further comprising: starting a time interval in response to deciding to block the PS communication; and
   upon expiry of the time interval, and the CS call being still in progress, reevaluating the plurality of air interface parameters relating to the in progress CS call and then deciding whether to block the PS communication based at least in part on the reevaluation.

7. The method of claim 1, further comprising deciding not to block the PS communication when one of:
   received signal code power (RSCP) from a serving base station is greater than a predetermined threshold and EcNo is greater than a predetermined threshold; and
   user equipment transmit power is less than a predetermined threshold.

8. The method of claim 1, further comprising deciding not to block the PS communication when:
   the stored history indicates that a maximum number of PS communication blocks have been reached.

9. The method of claim 8, further comprising resetting the stored history to indicate there have been zero PS communication blocks after not blocking the PS communication.

10. A mobile telephony device, comprising:
    a processor; and
    a computer readable storage medium storing instructions that, when executed by the processor, cause the processor to perform a method for managing a packet service (PS) communication, the method comprising:
      receiving a request for a PS communication from a background task running in the mobile telephony device;
      determining that a circuit service (CS) call is in progress;
      in response to the determining, evaluating a plurality of air interface parameters relating to the in progress CS call and accessing a stored history of PS communication blocks; and
      deciding whether to block the PS communication based at least in part on the evaluation and the stored history.

11. The mobile telephony device of claim 10,
    wherein the method comprises deciding to block the PS communication
    when:
      received signal code power (RSCP) from a serving base station is less than a predetermined threshold and EcNo is less than a predetermined threshold; and
      the stored history indicates that there have been fewer than a maximum number of PS communication blocks.

12. The mobile telephony device of claim 10,
    wherein the method comprises deciding to block the PS communication when:
      mobile telephony device transmit power is greater than a predetermined threshold; and
      the stored history indicates that there have been fewer than a maximum number of PS communication blocks.

13. The mobile telephony device of claim 10, wherein the method comprises deciding not to block the PS communication when one of:
    received signal code power (RSCP) from a serving base station is greater than a predetermined threshold and EcNo is greater than a predetermined threshold; and
    mobile telephony device transmit power is less than a predetermined threshold.

14. The mobile telephony device of claim 10,
    wherein the method comprises deciding not to block the PS communication
    when:
      the stored history indicates that a maximum number of PS communication blocks have been reached.

15. The mobile telephony device of claim 14, wherein the method comprises resetting the stored history to indicate there have been zero PS communication blocks after not blocking the PS communication.

16. The mobile telephony device of claim 10, wherein the method comprises:
    starting a time interval in response to deciding to block the PS communication; and
    upon expiry of the time interval, and the CS call being still in progress, reevaluating the plurality of air interface parameters relating to the in progress CS call and then deciding whether to block the PS communication based at least in part on the reevaluation.

17. A non-transitory computer readable storage medium storing instructions that, when executed by mobile communications user equipment, cause the mobile communications user equipment to perform a method for managing a packet service (PS) communication, the method comprising:
    receiving a request for a PS communication from a background task running in the mobile communications user equipment;
    determining that a circuit service (CS) call is in progress;
    in response to the determining, evaluating a plurality of air interface parameters relating to the in progress CS call and accessing a stored history of PS communication blocks; and
    deciding whether to block the PS communication based at least in part on the evaluation and the stored history.

18. The non-transitory computer readable storage medium of claim 17, wherein the method comprises deciding to block the PS communication when:
    received signal code power (RSCP) from a serving base station is less than a predetermined threshold and EcNo is less than a predetermined threshold; and
    the stored history indicates that there have been fewer than a maximum number of PS communication blocks.

19. The non-transitory computer readable storage medium of claim 17, wherein the method comprises deciding to block the PS communication when:
    user equipment transmit power is greater than a predetermined threshold; and
    the stored history indicates that there have been fewer than a maximum number of PS communication blocks.

20. The non-transitory computer readable storage medium of claim 17, wherein the method comprises deciding not to block the PS communication when one of:
    received signal code power (RSCP) from a serving base station is greater than a predetermined threshold and EcNo is greater than a predetermined threshold; and
    user equipment transmit power is less than a predetermined threshold.

21. The non-transitory computer readable storage medium of claim 17, wherein the method comprises deciding not to block the PS communication when:
    the stored history indicates that a maximum number of PS communication blocks have been reached.

22. The non-transitory computer readable storage medium of claim 21, wherein the method comprises resetting the stored history to indicate there have been zero PS communication blocks after not blocking the PS communication.

23. The non-transitory computer readable storage medium of claim 17, wherein the method comprises:
- starting a time interval in response to deciding to block the PS communication; and
- upon expiry of the time interval, and the CS call being still in progress, reevaluating the plurality of air interface parameters relating to the in progress CS call and then deciding whether to block the PS communication based at least in part on the reevaluation.

\* \* \* \* \*